United States Patent
Monismith et al.

(10) Patent No.: US 10,601,047 B1
(45) Date of Patent: Mar. 24, 2020

(54) PRE-CRACKED ANODE PARTICLES FOR HIGH-RATE CHARGING APPLICATIONS

(71) Applicants: Chongqing Jinkang New Energy Automobile Co., Ltd., Chongqing (CN); SF Motors Inc., Santa Clara, CA (US)

(72) Inventors: Scott Monismith, Santa Clara, CA (US); Brennan Campbell, Santa Clara, CA (US); Ying Liu, Santa Clara, CA (US); Yifan Tang, Santa Clara, CA (US)

(73) Assignees: Chongqing Jinkang New Energy Automobile Co., Ltd., Chongqing (CN); SF Motors Inc., Santa Clara, CA (US)

( * ) Notice: Subject to any disclaimer, the term of this patent is extended or adjusted under 35 U.S.C. 154(b) by 0 days.

(21) Appl. No.: 16/373,612

(22) Filed: Apr. 2, 2019

(51) Int. Cl.
| | | |
|---|---|---|
| *H01M 4/62* | (2006.01) | |
| *H01M 10/0525* | (2010.01) | |
| *H01M 4/13* | (2010.01) | |
| *H01M 4/587* | (2010.01) | |
| *C01B 32/20* | (2017.01) | |
| *H01M 4/133* | (2010.01) | |
| *H01M 4/86* | (2006.01) | |

(52) U.S. Cl.
CPC ............ *H01M 4/62* (2013.01); *C01B 32/20* (2017.08); *H01M 4/13* (2013.01); *H01M 4/133* (2013.01); *H01M 4/587* (2013.01); *H01M 4/624* (2013.01); *H01M 4/8605* (2013.01); *H01M 10/0525* (2013.01)

(58) Field of Classification Search
CPC .......... H01M 4/62; H01M 4/587; H01M 4/13; H01M 4/133; H01M 4/621; H01M 4/8605; H01M 10/0525; C01B 32/20
USPC ........................................... 429/212
See application file for complete search history.

(56) References Cited

U.S. PATENT DOCUMENTS

| | | | | |
|---|---|---|---|---|
| 9,508,980 | B2 * | 11/2016 | Ishii | H01M 4/0404 |
| 9,935,333 | B2 * | 4/2018 | Singh | H01M 4/131 |
| 2002/0018934 | A1 * | 2/2002 | Majima | H01M 4/133 |
| | | | | 429/231.8 |
| 2012/0219863 | A1 * | 8/2012 | Takahashi | H01M 4/587 |
| | | | | 429/231.8 |
| 2014/0170503 | A1 * | 6/2014 | Yushin | H01M 10/0525 |
| | | | | 429/306 |

(Continued)

FOREIGN PATENT DOCUMENTS

JP          07230803 A     *  8/1995

OTHER PUBLICATIONS

Machine translation of JP 07-230803 (no date).*

(Continued)

*Primary Examiner* — Amanda C. Walke
(74) *Attorney, Agent, or Firm* — Kilpatrick Townsend & Stockton LLP

(57) ABSTRACT

A battery cell includes a cathode layer and an anode layer. The anode layer includes anode particles, and a plurality of the anode particles have non-spanning cracks induced in the anode particles from cyclic tension applied to the anode layer prior to the anode layer being combined with the cathode layer in the battery cell. The battery cell also includes a case, where the cathode layer and the anode layer are housed within the case.

15 Claims, 13 Drawing Sheets

(56) References Cited

U.S. PATENT DOCUMENTS

| | | | |
|---|---|---|---|
| 2014/0227522 A1* | 8/2014 | Sasaki | H01M 4/364 |
| | | | 428/402 |
| 2017/0084913 A1* | 3/2017 | Misaki | H01M 4/0471 |
| 2018/0102543 A1* | 4/2018 | Su | H01M 4/625 |
| 2019/0115588 A1* | 4/2019 | Matsuhara | H01M 4/1391 |
| 2019/0148718 A1* | 5/2019 | Hatazawa | H01M 4/134 |

OTHER PUBLICATIONS

Liu et al, Lithiation-induced tensile stress and surface cracking n silicon thin film anode for chargeable lithium battery, Journal of Applied Physics, 112, 093507 1-5, 2012 (Year: 2012).*

Gao et al, Superior Cycling Performance of SiOx/C Compositewith Arrayed Mesoporous Architecture as Anode Material for Lithium-Ion Batteries, Journal of The Electrochemical Society, 161(14) A2216-A2221 (2014). (Year: 2014).*

Lin et al, Understanding the crack formation of graphite particles in cycled commercial lithium-ion batteries by focused ion beam-scanning electron microscopy, Journal of Power Sources, 365, 235-239 (2017). (Year: 2017).*

Takahashi et al, Examination of Graphite Particle Cracking as a Failure Mode in Lithium-Ion Batteries: A Model-Experimental Study, Journal of The Electrochemical Society, 162 (4), A635-A645 (2015). (Year: 2015).*

\* cited by examiner

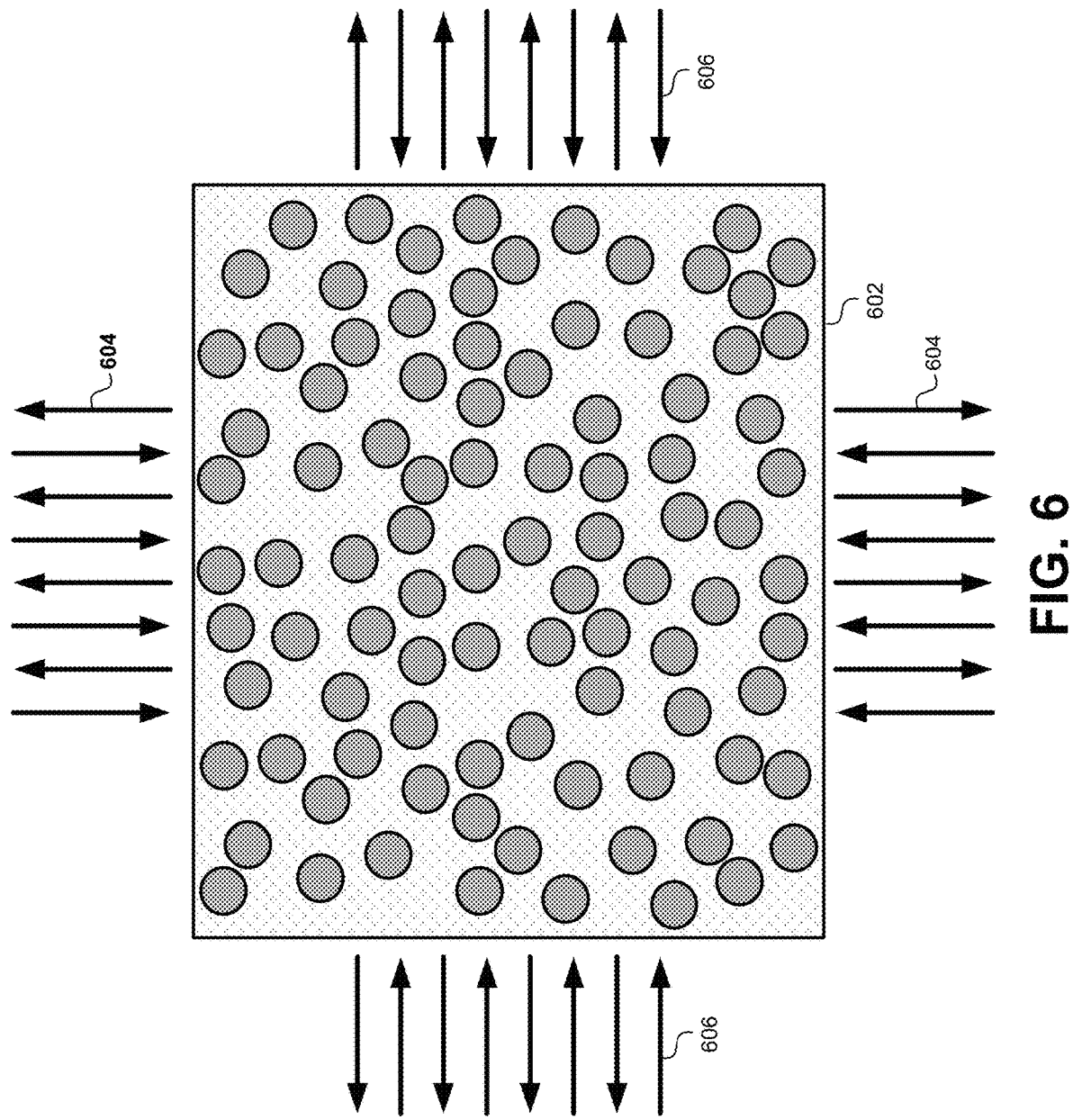

US 10,601,047 B1

PRE-CRACKED ANODE PARTICLES FOR HIGH-RATE CHARGING APPLICATIONS

BACKGROUND

Lithium-ion ("Li-ion") batteries are extensively used for energy storage applications. These applications include powering electric vehicles ("EVs") and personal electric devices, such as laptops computers, digital music players, smart phones, and so forth. Li-ion batteries are particularly advantageous in these application due to their high energy density, high operational voltage, and low self-discharge rate. However, despite their widespread use and growing popularity, serious technical challenges remain in the use of Li-ion cells. These challenges include range per charge, charging time, cost, safety, and most importantly, cell lifetime. These challenges are especially pronounced in EV applications where long-term cycling and lifetimes of 10-15 years are expected.

Generally, it is difficult to provide in anode material that is capable of fast charging without also sacrificing the energy density of the material. Increasing the porosity of the material also decreases the tortuosity of the material, making it easier for lithium ions to traverse. However the material's porosity also directly impacts the volumetric energy density, as a more porous volume leads to less volume being occupied by active material.

BRIEF SUMMARY

In some embodiments, a battery cell may include a cathode layer and an anode layer including anode particles, where a plurality of the anode particles may have non-spanning cracks induced in the anode particles from cyclic tension applied to the anode layer prior to the anode layer being combined with the cathode layer in the battery cell. The battery cell may also include a case, where the cathode layer and the anode layer are housed within the case. The cyclic tension may also include a plurality of tension cycles in a second axial direction of the anode layer.

In some embodiments, a method of providing a battery cell with pre-cracked anode particles may include providing an anode substrate; depositing a plurality of anode particles on the anode substrate to form an anode layer; applying cyclic tension to the anode layer until non-spanning cracks are induced in the anode particles; and combing the anode layer with a cathode layer in the battery cell.

In any embodiments, any of the following features may be included in any combination and without limitation. The anode particles may include graphite particles. The non-spanning cracks may increase the surface area of the plurality of anode particles to receive lithium ions. The cyclic tension may include a plurality of tension cycles in a first axial direction of the anode layer. The cyclic tension may also include a plurality of tension cycles in a second axial direction of the anode layer. The first axial direction may be orthogonal to the second axial direction. The cyclic tension may include at least 100 tension cycles. The anode particles may also include a layer of passive Solid Electrolyte Interphase (SEI) caused by the non-spanning cracks. The cyclic tension may be applied above a first threshold such that the non-spanning cracks form, but below a second threshold such that spanning cracks would form. The anode layer may also include a binder, a conductive material, and silicon.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 6 illustrates a process for generating non-spanning cracks in an anode layer, according to some embodiments.

DETAILED DESCRIPTION

Figure 1A:
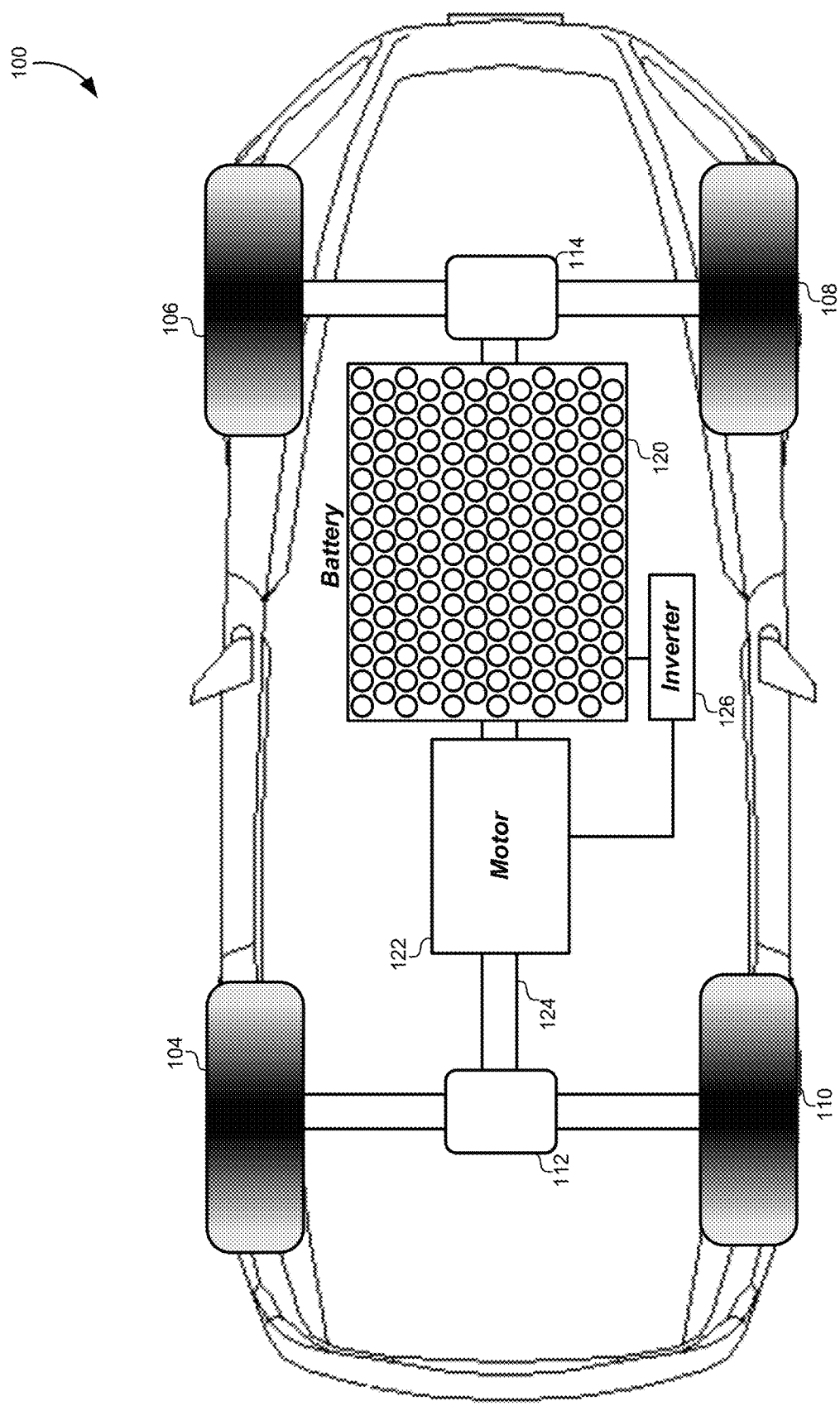
FIG. 1A illustrates a simplified diagram of a drivetrain of an electric vehicle, according to some embodiments.

Described herein, are embodiments for generating a battery cell with pre-cracked anode particles. Pre-cracking anode particles can increase the surface area of the anode particles and thereby reduce the diffusion length for the lithium particles and increase the charge rate. The anode particles can be pre-cracked by applying cyclic attention to and anode layer to form cracks in the anode particles that do not span through the anode particles. This can cause a passive layer of SEI to form on the anode particles, and while this may cause some capacity loss, it also allows the benefits of the faster charge rate to be realized early in the battery lifecycle rather than late in the battery cycle when the gains are typically offset by degradation of the battery components.

Lithium ion battery cells are seeing widespread use in commercial, residential, and automotive applications. However, one of the barriers that prevents lithium-ion batteries from replacing traditional energy technologies is battery charging. For example, the automotive industry is still primarily powered by the traditional gasoline combustion engine. One of the distinct advantages of the combustion engine is how rapidly it can be refueled. For example, a stop at a gas station typically takes less than 5 minutes and can produce hundreds of miles of energy for a vehicle powered by a combustion engine. In contrast, electric vehicles powered by lithium-ion batteries can require more than 30 minutes to recharge the car's battery cells. It is this difference in the rate of refueling versus the rate of recharging that deters many individuals who would otherwise be likely to use an electric vehicle.

In order to make electric vehicles more palatable to the general public, battery charging cycles for electric vehicles should be made as short as possible. Therefore, the ability to rapidly charge lithium-ion batteries is of great importance to the industry. If the batteries in an electric vehicle can be recharged to an 80% state of charge (SOC) in under 30 minutes, electric vehicles may be much more competitive with traditional combustion engines. Therefore, the ability to rapidly charge lithium-ion batteries can provide technological improvements that affect energy efficiency, energy independence, environmental concerns, cost-effectiveness, and provide many other economic and societal benefits.

Charging a lithium battery involves transferring lithium ions from the cathode to the anode. During a charge cycle, lithium ions are moved across a separator layer between the cathode and the anode and absorbed by the anode particles. In some embodiments, the anode particles may include graphite particles. When charging a lithium battery, there is a fundamental rate at which graphite in the anode can be intercalated with lithium during a charging cycle. While there are many factors that affect the charge rate, shorter diffusion lengths generally lead to better kinetics, faster absorption, and higher charge rates. Note that these factors also affect the discharge rate, but because graphite generally discharges rapidly compared to its absorption rate, charging a battery is usually the limiting factor rather than discharging the battery. Thus, one way to improve the performance of lithium batteries and make their use in electric vehicles more palatable is to improve the absorption rate of the anode particles.

Prior to this disclosure, one method of increasing the absorption rate of anode particles was to increase the porosity of the particles. The increased porosity can generally lead to an improvement in conductivity and diffusivity of the lithium ions in the electrolyte. In some cases, researchers proposed decreasing the size of the anode particles to allow the lithium ions to penetrate between the anode particles more readily. However, due to the temperature and pressure at which the graphite slurries are mixed when fabricating a lithium-ion battery, it is very difficult to further decrease the size of the anode particles. Further reductions in size required the introduction of foreign materials into the slurry to further "grind" the particles into a smaller size.

To address these and other technology problems in the art, the embodiments described herein provide for a battery cell using an anode with deliberately cracked anode particles. Cracks in the anode particles can decrease the diffusion length by increasing the surface area of the anode particles that is exposed to the electrolyte and lithium ions. Cracks will form naturally in the anode particles during the lifetime of the battery cell. When lithium flows into the anode particles, expansion occurs resulting in internal tensile stresses that form cracks in the anode particles. These resulting cracks gradually tend to shorten the diffusion length and increase the surface area of the anode particles. However, when cracks are introduced gradually due to use over the lifetime of the battery, they also tend to facilitate the formation of Solid-Electrolyte Interphase (SEI) on the anode as a passivation layer. SEI is one of the two major sources of capacity-fade in lithium batteries. Thus, the benefits of allowing cracks to form gradually over time for increasing the charge rate are counterbalanced by the negative effect of the SEI growth on the anode particles.

The embodiments described herein deliberately cause cracks in the anode particles rather than allowing them to form naturally over time. By deliberately cracking the anode particles, the benefits of decreased diffusion length and increased surface area are realized without causing the parasitic growth of the SEI. In other words, these embodiments realize the positive effects of anode cracks while preventing their negative effects that would otherwise accompany their formation over time.

Before describing the structure and process for fabricating lithium batteries with pre-cracked anode particles, a description of their use in an electric vehicle or other battery management system will be described. Additionally, this disclosure will generally describe the physical structure and operation of a lithium battery to give context to the process by which the pre-cracked anode particles are created, used, and deployed. However, it will be understood that these embodiments are provided merely by way of example and are not meant to be limiting. Other physical battery structures may also be used in the place of the "jelly roll" structure described below. Additionally, lithium batteries using pre-cracked anode particles may be used in a wide variety of applications aside from electric vehicles. These applications may include consumer electronics, portable computing devices, cell phones, laptop/tablet computers, military equipment, radio equipment, sensor networks, health monitoring systems, and so forth.

FIG. 1A illustrates a simplified diagram of a drivetrain of an electric vehicle 100, according to some embodiments. The operating conditions and requirements for use in an electric vehicle may be particularly well-suited for the three-electrode cells described herein. The electric vehicle 100 includes a battery 120. The battery 120 may typically be comprised of a plurality of individual battery cells. For example, the battery 120 may include hundreds of lithium-ion battery cells connected in parallel/serial configurations to provide a steady DC voltage and a large amount of current to power the electric vehicle 100. The battery 120 may also be equipped with a temperature management system (TMS) that regulates the temperature of the plurality of individual battery cells. For example, the TMS may include channels for circulating coolant and/or a "cold plate" adjacent to the plurality of individual battery cells. These elements can provide heat to the battery 120 in cold environments and/or remove heat from the battery 120 in warmer operating environments. The TMS can regulate the battery temperature 120 to ensure that the individual battery cells are charged and discharged within an ideal operating temperature range to avoid damage to the individual battery cells (e.g., lithium plating).

The battery 120 may provide DC current to an inverter 126. The inverter 126 can convert the DC current into an AC current that can be circulated through a stator of the motor 122. One or more rotors positioned inside of the stator in the motor 122 can be equipped with permanent magnets. For example, an interior permanent-magnet (IPM) motor or a surface permanent-magnet (SPM) motor may include permanent magnets that are mounted inside or outside of the bodies of the rotors. The windings in the stator through which the AC current flows generates a rotating magnetic field. The rotating magnetic field induces a current in the magnets of the rotors. It is the interaction between the field produced by the stator and the resulting current in the magnets that produces the driving force for the motor 122.

As the rotors of the motor 122 are rotated by virtue of the electric power provided by the battery 120, the rotors turn a shaft 124. Differential modules 112, 114 translate the rotational motion of the shaft 124 into orthogonal rotational motion for the wheels 104, 106, 108, 110 of the electric vehicle 100. In this simplified diagram, only a single motor 122 is used to drive each of the wheels 104, 106, 108, 110. However, other embodiments may use a plurality of motors, each of which drive a subset of the wheels 104, 106, 108, 110. For example, some embodiments may use a first motor to drive the rear wheels 104, 110 along with a second motor to drive the front wheels 106, 108. In these embodiments, a single battery 120 can power each of the plurality of motors, or multiple batteries may provide power to the plurality of motors.

Figure 1B:
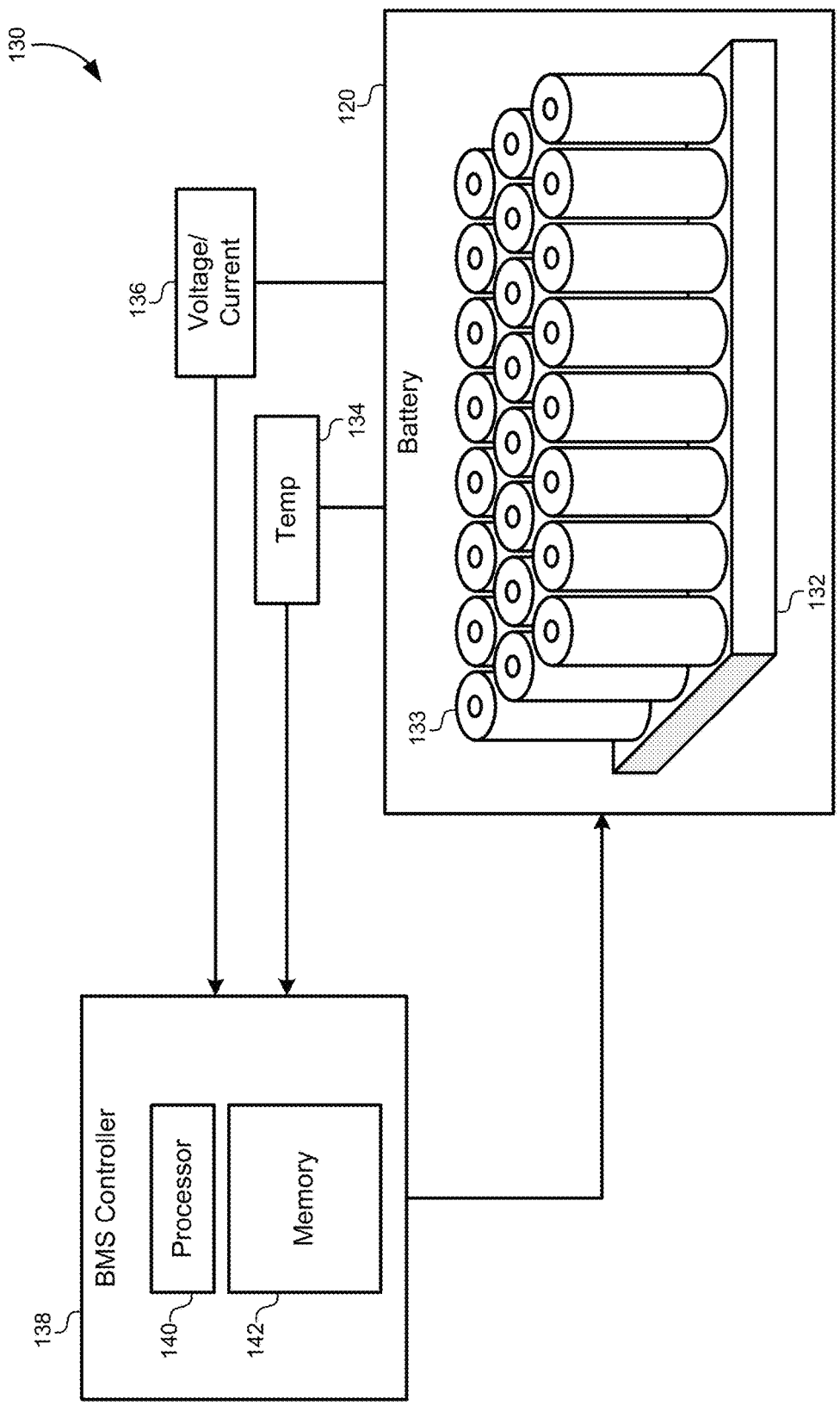
FIG. 1B illustrates a simplified block diagram of a Battery Management System (BMS) 130 that may be used in an electric vehicle, according to some embodiments.

FIG. 1B illustrates a simplified block diagram of a Battery Management System (BMS) 130 that may be used in an electric vehicle, according to some embodiments. As described above, the battery 120 may include a plurality of individual battery cells 133. The BMS 130 may include many electrical and mechanical components, only a portion of which are explicitly illustrated in FIG. 1B. For example, the BMS 130 may include a plurality of sensors, such as temperature sensors 134, voltage/current sensors 136, and other sensors configured to monitor the state and environment of the battery cells 133. Sensor readings may be processed by a BMS controller 138 that includes a processor 140, a memory 142, and other computer system components described in detail below in relation to FIG. 10.

To complete the control loop, the BMS 130 may include one or more devices that are configured to add or remove heat from the plurality of battery cells 133. For example, the BMS may include a TMS that includes a heat exchanger and heat transfer device(s) (e.g., a cold plate, coolant circulation tubes, radiant heating, ventilation, etc.) that can be used to regulate the temperature of the individual battery cells 133 during charging/discharging in the electric vehicle. The BMS 130 can use the control loop to perform a number of different thermal operations in relation to the plurality of battery cells 133. First, the BMS 130 can perform a cooling function that removes heat from the plurality of battery cells 133. For example, when the battery cells 133 reach their optimal temperature performance range, the BMS 130 can circulate liquid coolant through a heat transfer device to remove heat from the batteries 133. Second, the BMS 130 can provide heat to the batteries 133 during cold temperatures. For example, when charging or fast-charging batteries with temperatures below the optimal temperature range, the BMS 130 can heat the batteries 133 by circulating heated material (e.g., fluid, air, etc.) around the batteries 133. Some embodiments may also use electric heating to increase the temperature of the batteries 133. Some embodiments of the BMS 130 can also provide insulation around the batteries 133 to protect against extreme weather outside of the electric vehicle. The BMS 130 may also provide ventilation or air circulation in addition to the basic cooling/heating functions.

Another aspect of the control loop for the BMS 130 may include the monitoring and regulation of electrical characteristics of the battery cells 133. For example, the BMS controller 138 can use the voltage/current sensors 136 to monitor the output current and voltage of subsets of the individual battery cells 133. Measurements can be processed by the BMS controller 138 and used to better control the voltage/current output of the battery 120 to better control efficient charging cycles, to better predict battery life cycles, and to increase the lifetime of the battery cells 133.

Figure 2:
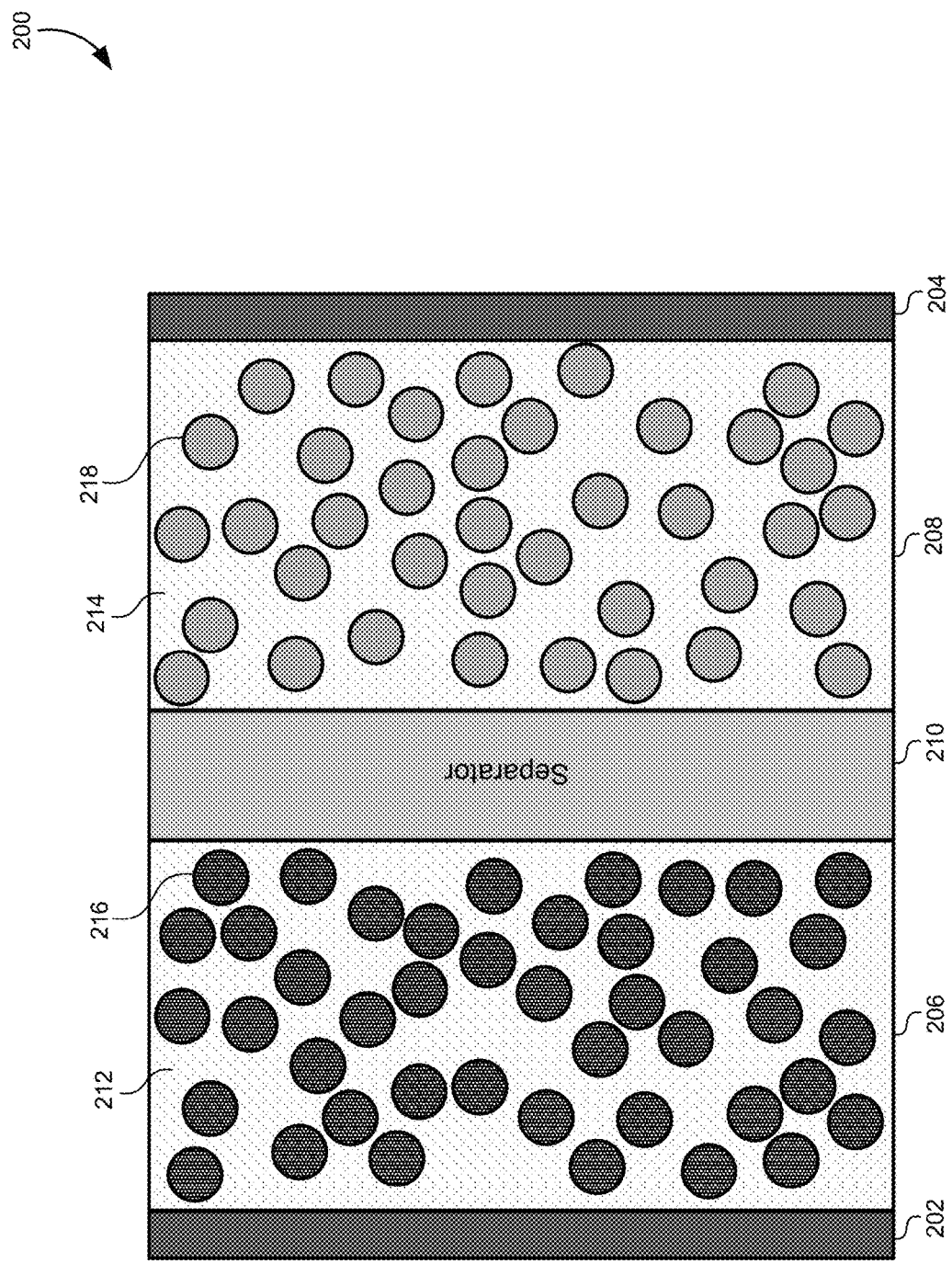
FIG. 2 illustrates a simplified diagram of the layers of a lithium battery used in electric vehicles, according to some embodiments.

FIG. 2 illustrates a simplified diagram of the layers of a lithium battery 200 that may be used in electric vehicles, according to some embodiments. A typical battery includes thin layers of material that are compressed together and rolled into a cylinder, "jelly roll," or "Swiss roll." The jelly roll design is commonly used in a majority of cylindrical rechargeable batteries. In this design, an insulating sheet may be provided, followed by a thin layer of anode material. Next, a separator layer may be applied, and a cathode material may be layered on top. These layers may then be rolled up and inserted into a hollow cylinder casing. As described below, the battery cell may then be sealed, and metal contacts for the anode and/or cathode at the top and bottom of the jelly roll can be coupled to the case and/or cap of the battery. Specifically, the jelly roll may include anode and cathode leads that are connected to terminals of a battery housing that encases and protects the jelly roll. In some embodiments, the anode and cathode can both be coupled to a top cap of the battery cell. FIG. 2 illustrates each of these layers in detail. These layers not only represent the physical layers in an actual lithium battery, they also represent a basic physics model using porous electrode and concentrated solution theories that accurately captures lithium ion migration inside the battery.

A lithium battery may include a pair of current collectors 202, 204 that are connected to the anode and cathode leads respectively. The anode current collector 202 may comprise a sheet of copper, and the cathode current collector 204 may comprise a sheet of aluminum, although other materials may be used for either current collector 202, 204. The battery 200 may include a negative anode electrode 206 and a positive cathode electrode 208 that are isolated by a separator 210. Each electrode 206, 208 may include active particles 216, 218 and electrolyte solutions 212, 214. According to this physics model, the electrolyte phase may be continuous across the anode 206, separator 210, and cathode 208, with a solid particles phase that exists in the anode 206 and cathode 208. The solid active materials 216, 218 can be modeled as a matrix of mono-sized spherical particles as illustrated in FIG. 2.

During the discharge process, lithium may be diffused to the surface of the anode 206 and may undergo an electrochemical reaction. This reaction results in the release of electrons and transfers lithium to the electrolyte phase. The lithium ions may diffuse and conduct through the electrolyte 212, 214 from the anode 206 to the cathode 208 where a similar reaction transfers lithium to the positive solid phase. Lithium is then stored inside the active materials 218 of the cathode 208 as the battery 200 is discharged. Charging the battery 200 can be modeled using the opposite process described above. This lithium-ion transport process in the porous electrode and electrolyte solution can be described by charge and mass conservation laws. For example, charge conservation governs phase potentials, while mass conservation governs the phase concentrations of the electrolyte and solid phases in the chemistry of the battery 200.

Figure 3:
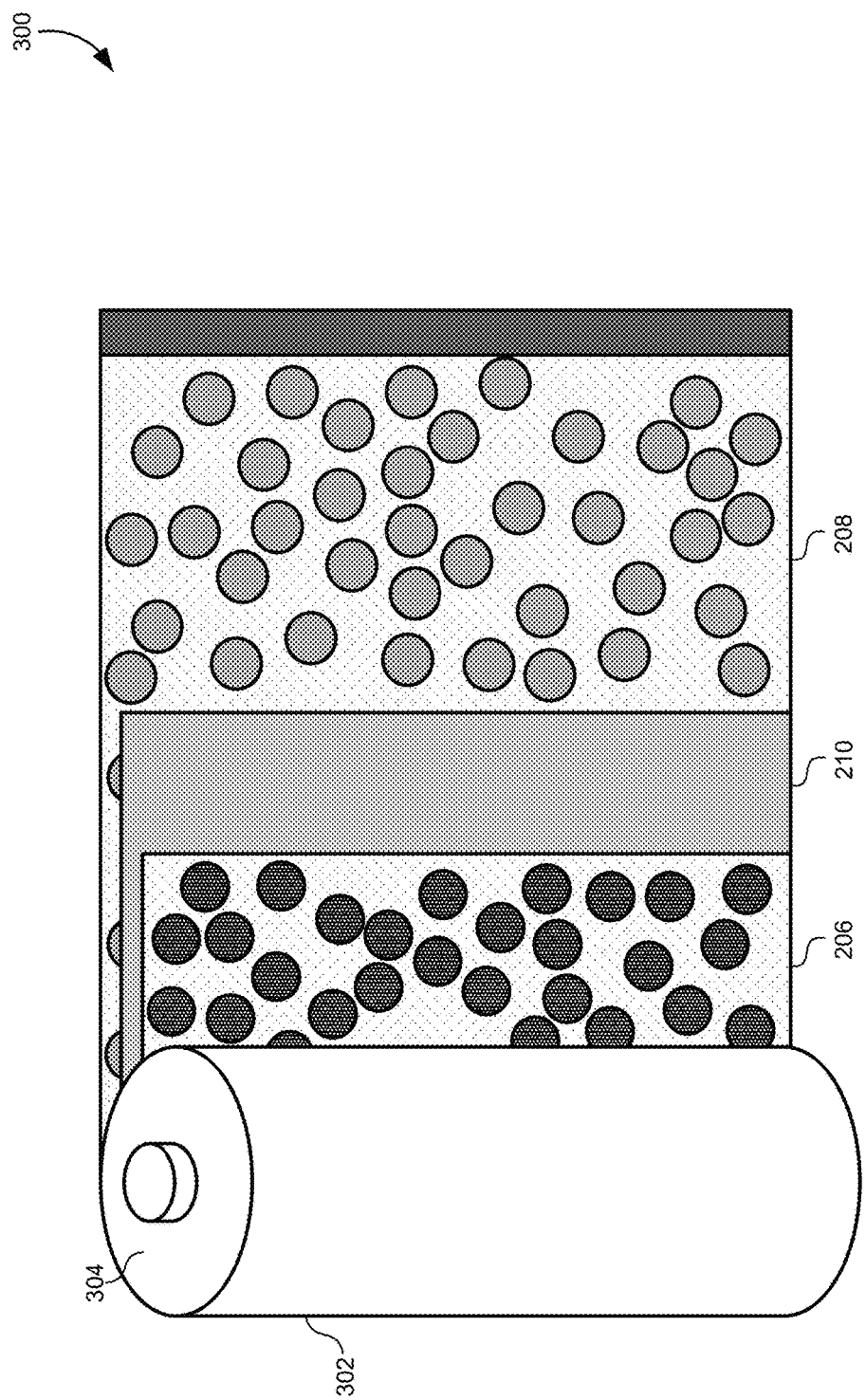
FIG. 3 illustrates a simplified diagram of how the various chemistry layers may be rolled up inside of a battery in a jelly roll configuration, according to some embodiments.

FIG. 3 illustrates a simplified diagram of how the various chemistry layers may be rolled up inside of a battery 300 in a jelly roll configuration, according to some embodiments. Each of the layers described in the model above can be placed in thin sheets on top of each other and rolled up into a cylinder inside of the housing of the battery 200. For example, the anode 206 may include a thin layer of graphite. The cathode 206 may use a layer of the lithium oxide family (e.g., lithium cobalt oxide, lithium manganese oxide, etc.). Each of these layers may be approximately uniform vertically within the battery 200. Therefore, under ideal conditions, current may flow back and forth between the anode 206 and the cathode 208 uniformly at the bottom of the battery 200 and the top of the battery 200, resulting in a nearly uniform current density throughout.

Figure 4:
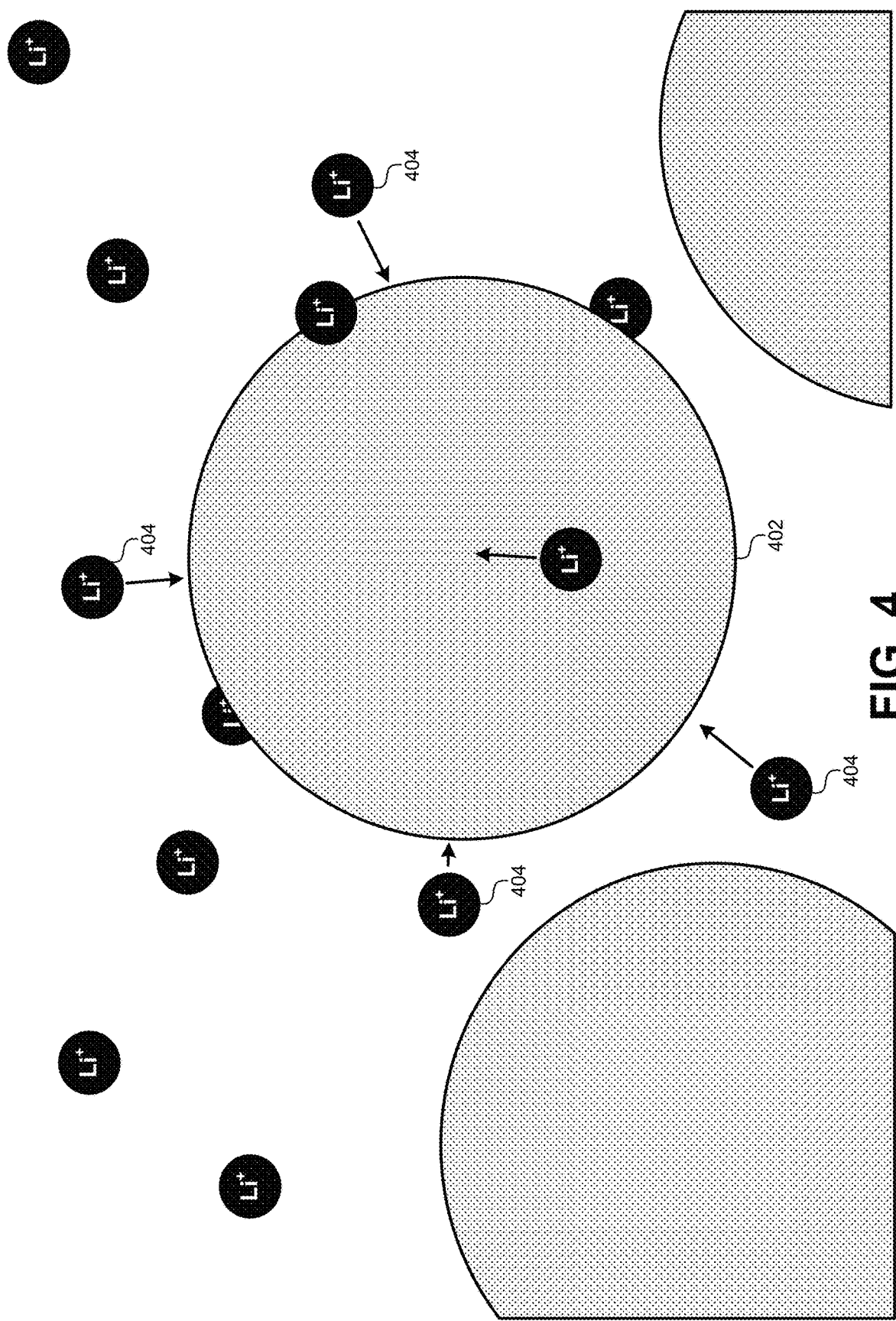
FIG. 4 illustrates a diagram of a plurality of anode particles during the absorption of a plurality of lithium ion particles, according to some embodiments.

FIG. 4 illustrates a diagram of a plurality of anode particles 402 during the absorption of a plurality of lithium ion particles, according to some embodiments. As described above, the anode may be composed of a large plurality of small graphite particles on the order of about 10 microns. In one example embodiment, the anode particles 402 may include graphite particles with a relatively small number of silicon particles mixed in the slurry. These anode particles 402 may act as diffusion sites for the lithium 404, and thereby may allow for the mobility of the lithium ions 404. The anode material can be ground into anode particles (rather than using a solid block of graphite) in order to increase the flexibility of the anode layer and to improve the diffusion rate of lithium into the anode particles 402 by exposing more surface area. In some embodiments, the slurry of anode particles 402 can be coated onto a layer of an anode substrate, such as a layer of copper. In contrast, the cathode layer may include a layered oxide spread on a substrate, such as an aluminum base. Some embodiments may also mix the slurry of particles with a small amount of binder to keep the particles attached to the metal layer beneath. Some embodiments may also include a conductive additive that allows the electric current to flow through the anode. Note that these additional materials (conductive additive, silicon, binder, etc.) are not illustrated explicitly in FIG. 4. Instead, FIG. 4 focuses exclusively on the absorption of the lithium particles 404 by the anode particles 402.

In this simplified example, the anode particles 402 may be modeled as spherical particles. Note that in practice, the anode particles 402 may instead be formed as irregularly shaped particles that do not have precise spherical shapes. However, for purposes of illustration, the anode particles will be modeled herein as spherical particles to illustrate how the surface area of the anode particles 402 can be increased by deliberate pre-cracking. Similarly, the lithium ions 404 will be illustrated as spherical particles for similar reasons. Also note that the relative size between the anode particles 402 and the lithium ions 404 is not drawn to scale. Instead, the lithium ions 404 have been enlarged for the purpose of illustrating how they can be absorbed by the anode particles 404 during a charge cycle.

When charging, the lithium ions 404 can be absorbed by an outer surface of the anode particles 402. Therefore, when modeled as a sphere, the surface area of the anode particles 402 can be approximated by $4\pi r^2$, where r is the approximate radius of the anode particles 402. After being absorbed through the surface area of the anode particles 402, the lithium ions 404 will persist in the carbon lattice of the graphite until a discharge cycle of the battery causes the lithium ions 404 to be expelled from the anode particles 402 for transfer back into the cathode material.

Figure 5:
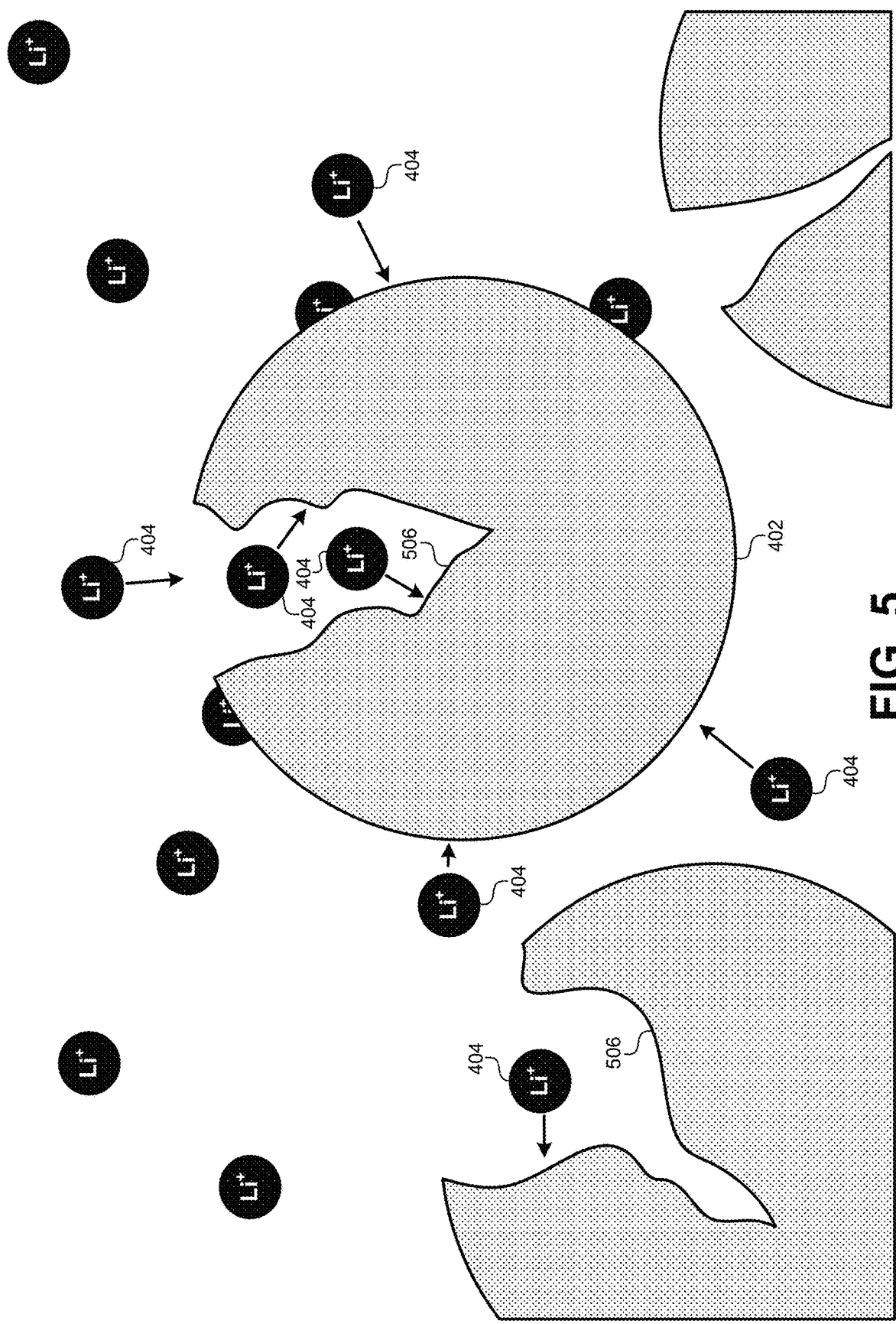
FIG. 5 illustrates a pre-cracked anode particle, according to some embodiments.

FIG. 5 illustrates a pre-cracked anode particle 402, according to some embodiments. In this embodiment, the crack 506 is not a spanning crack. In other words, the crack 506 does not extend entirely or almost entirely through the anode particles 402. Instead, the crack 506 extends somewhere between 20% and 80% of the way through the anode particles 402. A spanning crack would extend more than 80% of the way through the anode particles 402. As illustrated in FIG. 5, the non-spanning crack 506 increases the surface area of the anode particles 402, such that there is more surface area available for the absorption of the lithium ions 404. This increased surface area increases the overall rate at which lithium ions can be absorbed by the anode by increasing the number of lithium ions 404 that can be absorbed by each anode particle 402 during a given time interval.

Note that FIG. 5 is a two-dimensional representation of three-dimensional anode particles 402. Therefore, the illustration of the anode particles 402 in FIG. 5 may be considered a cross-sectional view of the anode particles 402. The cross-sectional view of the anode particles 402 illustrates the relative depth of the crack 506 compared to a representative approximated diameter of the anode particles 402. As described above, the actual anode particles 402 will typically not be exactly spherical. Similarly, the crack 506 may also extend through the anode particles 402 in a direction perpendicular to the cross-sectional view.

One method of pre-cracking anode particles may include using nano indentation. Nano indentation is a technique in which a probe tip is manipulated to indent the surface of small particles. Nano indentation would be a practical solution in a laboratory environment.

A more feasible method for creating non-spanning cracks is to apply cyclic tension to the anode layer. Applying cyclic tensile loads may include applying orthogonal, cyclic, tensile loads to the anode layer. FIG. 6 illustrates a process for generating non-spanning cracks in an anode layer, according to some embodiments. Pre-cracking the anode 602 may be achieved by coating the anode material onto a substrate, such as a traditional copper current collector. A cyclic tensile load may then be applied to the anode 602 in order to crack the anode particles. The tensile load may be repeatedly and alternately applied in a first axial direction 604 and in a second axial direction 606. The tensile load may be performed until cracks of a sufficient depth have been introduced such that the surface area of the anode particles increases before the cracks become spanning. Stated more plainly, this method may include repeatedly stretching the anode 602 material in alternating directions at a sub-crack threshold. This threshold ensures that the cracks are formed slowly and incrementally. The number of tension cycles may range from 100 cycles, 200 cycles, 500 cycles, 1000 cycles, and more.

After the cracks have formed, the process may include pouring a slurry of a low particle size (e.g., less than 20 microns) onto the anode 602 in order to coat the surface and ensure a contiguous pathway of electric conductivity between the cracked anode particles. Some embodiments may perform additional tensile load cycling after the slurry is added in order to further crack the anode particles. This second phase of tension cycling can be much shorter than the initial phase of tension cycling described above. After the initial cracks are formed, subsequent cycling can lead to full-spanning cracks that further decrease the diffusion length of the lithium ions and increase the charge rate of the battery cell. In some embodiments, subsequent charge cycles may also rapidly lead to spanning cracks. For example, during the first few charge cycles, the initial cracks may fully span the diameter of the anode particles.

Figure 7A:
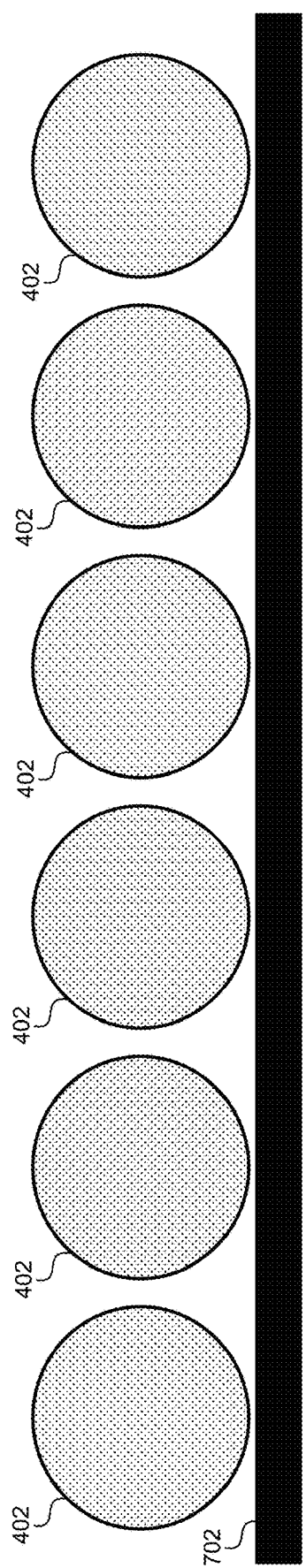
FIGS. 7A-7C illustrate the gradual process for pre-cracking anode particles, according to some embodiments.
Figure 7B:
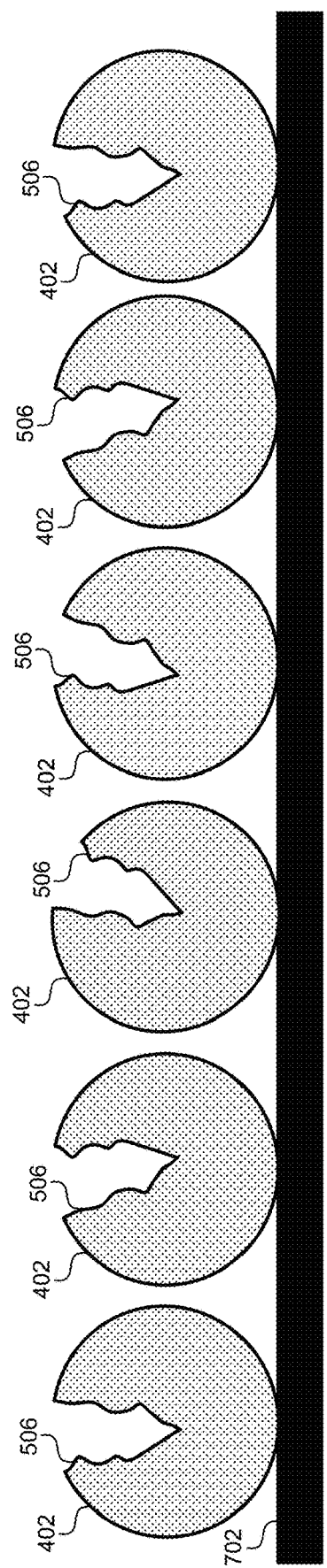
Figure 7C:
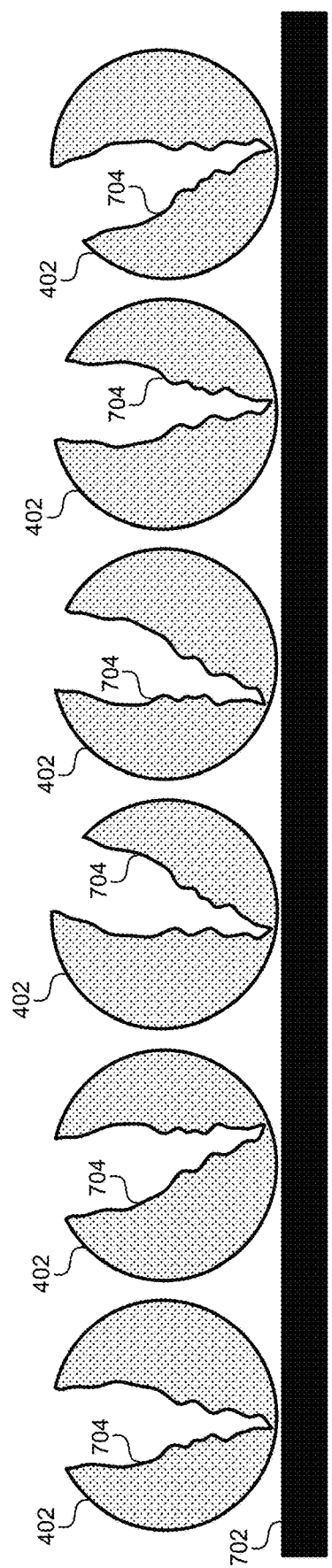

FIGS. 7A-7C illustrate the gradual process for pre-cracking anode particles, according to some embodiments. FIG. 7A illustrates a plurality of anode particles 402 that are adhered to a metal substrate 702. Although not shown explicitly in FIG. 7A, the anode particles 402 may be adhered to the substrate 702 along with a slurry mix of binder, conductive material, silicon, and so forth. FIG. 7B illustrates the anode particles 402 after non-spanning cracks 506 have been introduced into the anode particles 402 by way of the cyclic tensile load or other methods described above. FIG. 7C illustrates non-spanning cracks 506 have developed into spanning cracks 704. The spanning cracks 704 can be introduced by subsequent tensile cycling or by subsequent charge/discharge cycles in a battery environment.

Figure 8:
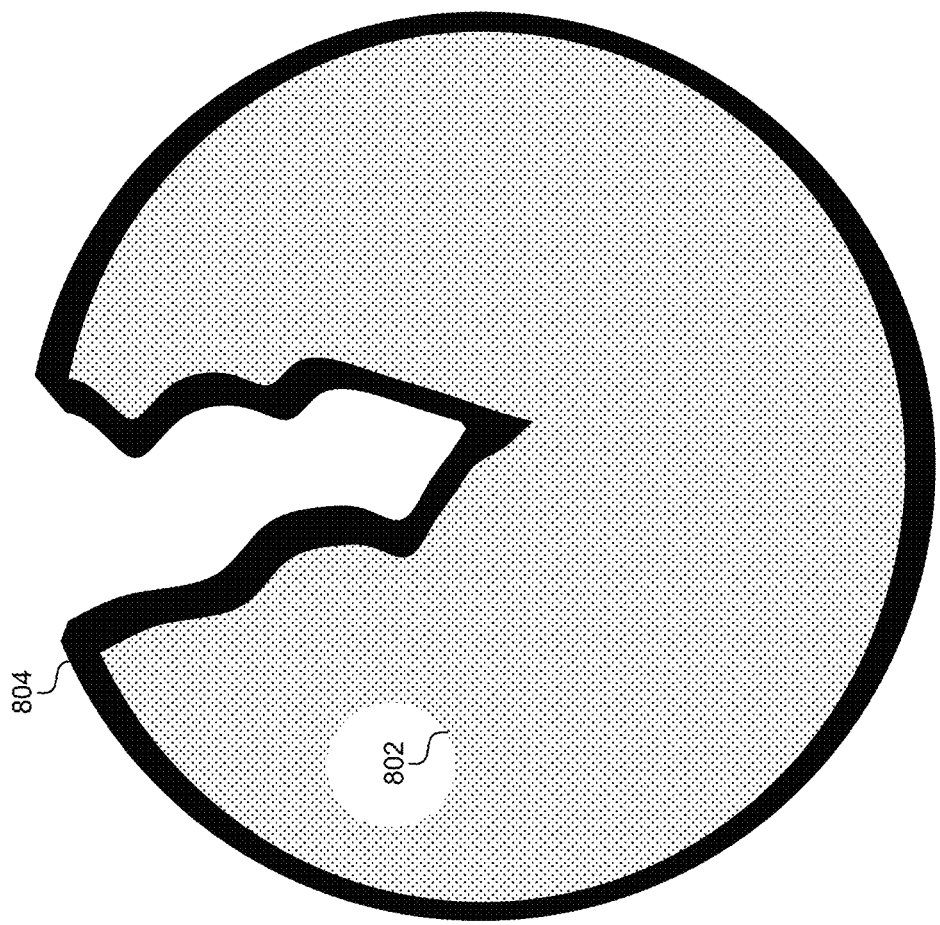
FIG. 8 illustrates an anode particle that has developed a layer of SEI, according to some embodiments.

FIG. 8 illustrates an anode particle 802 that has developed a layer of SEI 804, according to some embodiments. As mentioned briefly above, pre-cracking the anode particle 802 may introduce some initial formation of SEI 804 that would not otherwise form early in the lifecycle of the lithium battery. However, the SEI 804 that forms early in the lifecycle due to the pre-cracking is very small compared to the amount of SEI that would form later in the lifecycle of the anode particle 802. Specifically, if the SEI does not form until later in the lifecycle of the anode particle 802, then there will have been more time for the electrolyte to degrade, more time for gases to develop in the anode, and more time for SEI to grow naturally. Therefore, the SEI 804 that is produced by the initial pre-cracking of the anode particle 802 is not only less of a detriment to the performance of the battery cell, but it also is not as detrimental as the later-forming SEI that would have developed otherwise.

By pre-cracking the anode particle 802, there is a small trade-off. Specifically, while the SEI 804 is not as detrimental as later-forming SEI, the SEI 804 still will reduce the capacity of the battery cell. However, this capacity decrease is fairly minimal (e.g., less than 3%) when compared to the capacity loss that would occur by naturally formed SEI later in the lifecycle of the battery cell. Additionally, this allows the battery cell to realize the charge rate increase benefit immediately. Prior to this disclosure, cracks that develops naturally in the anode particle 802 would have the charge rate increase offset by the parasitic formation of SEI. The SEI formed later is also more detrimental than the type of SEI 804 formed through the pre-cracking process. Specifically, polymeric SEI formed later in life has a more detrimental effects on lithium absorption than the passive SEI formed through pre-cracking. Thus, while the battery would charge faster, the capacity would also would be far less. These embodiments allow the battery to charge faster from the outset without the corresponding level of capacity loss.

The early formation of the SEI 804 may also prevent the later formation of the detrimental polymeric SEI. SEI forms on the interface between the electrolyte and the anode particle 802. By forming the initial passivation layer of SEI 804, this interface is reduced such that the amount of detrimental SEI formed throughout the remainder of the battery lifecycle will be reduced. In essence, the SEI 804 forms a protective layer around the anode particle 802. Thus, forming more SEI 804 initially somewhat prevents the further formation of SEI later in the lifecycle of the battery cell. Even if the overall effect is a slightly reduced capacity of the cell through its lifecycle, this trade-off improves the charging rate capability from the beginning of the lifecycle rather than waiting until the end of the lifecycle when it is further offset by natural capacity loss, SEI growth, lithium plating, and so forth. For example, pre-cracking the anode particles 802 can lead to as much as a 10% increase in charge rate.

Figure 9:
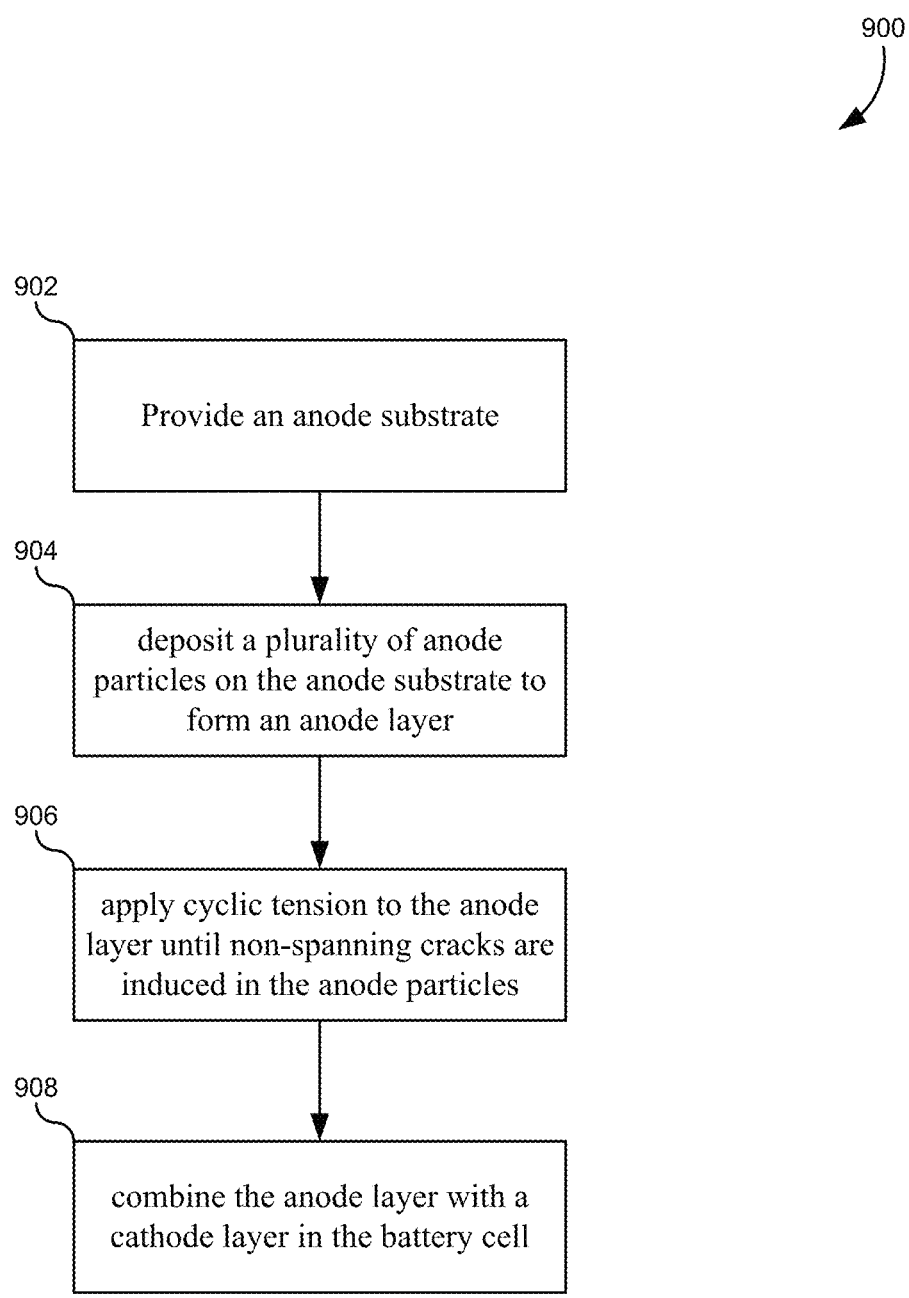
FIG. 9 illustrates a flowchart of a method for providing a battery cell with pre-cracked anode particles, according to some embodiments.

FIG. 9 illustrates a flowchart of a method for providing a battery cell with pre-cracked anode particles, according to some embodiments. The method may include providing an anode substrate (902). The anode substrate may comprise copper or another conductive material. The method may also include depositing a plurality of anode particles on the anode substrate to form an anode layer (904). The anode layer may also include additional materials, such as a binder, silicon particles, conductive materials, and so forth. In some embodiments, the anode particles may be formed from graphite, and the anode particles may be adhered to the anode substrate.

The method may additionally include applying cyclic tension to the anode layer until non-spanning cracks are induced in the anode particles (906). The non-spanning cracks may increase the surface area of the plurality of anode particles to receive lithium ions during a battery charge cycle. As described above, this may induce a passive layer of SEI to form on the anode particles. This may also increase the charge rate of the battery cell. In some embodiments, the cyclic tension may include a plurality of tension cycles in a first axial direction of the anode layer and/or a plurality of tension cycles in a second axial direction of the anode layer. The first and second axial directions may be orthogonal or perpendicular to each other. The cyclic tension may include at least 100 tension cycles. Thresholds may be set for the number and/or force applied during the tension cycles such that a first threshold allows non-spanning cracks to form. The cyclic tension may exceed the first threshold but not exceed a second threshold that would cause spanning cracks to form. The method may further include combining the anode layer with a cathode layer in a battery cell (908).

It should be appreciated that the specific steps illustrated in FIG. 9 provide particular methods of providing a lithium battery cell with pre-cracked anode particles according to various embodiments. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
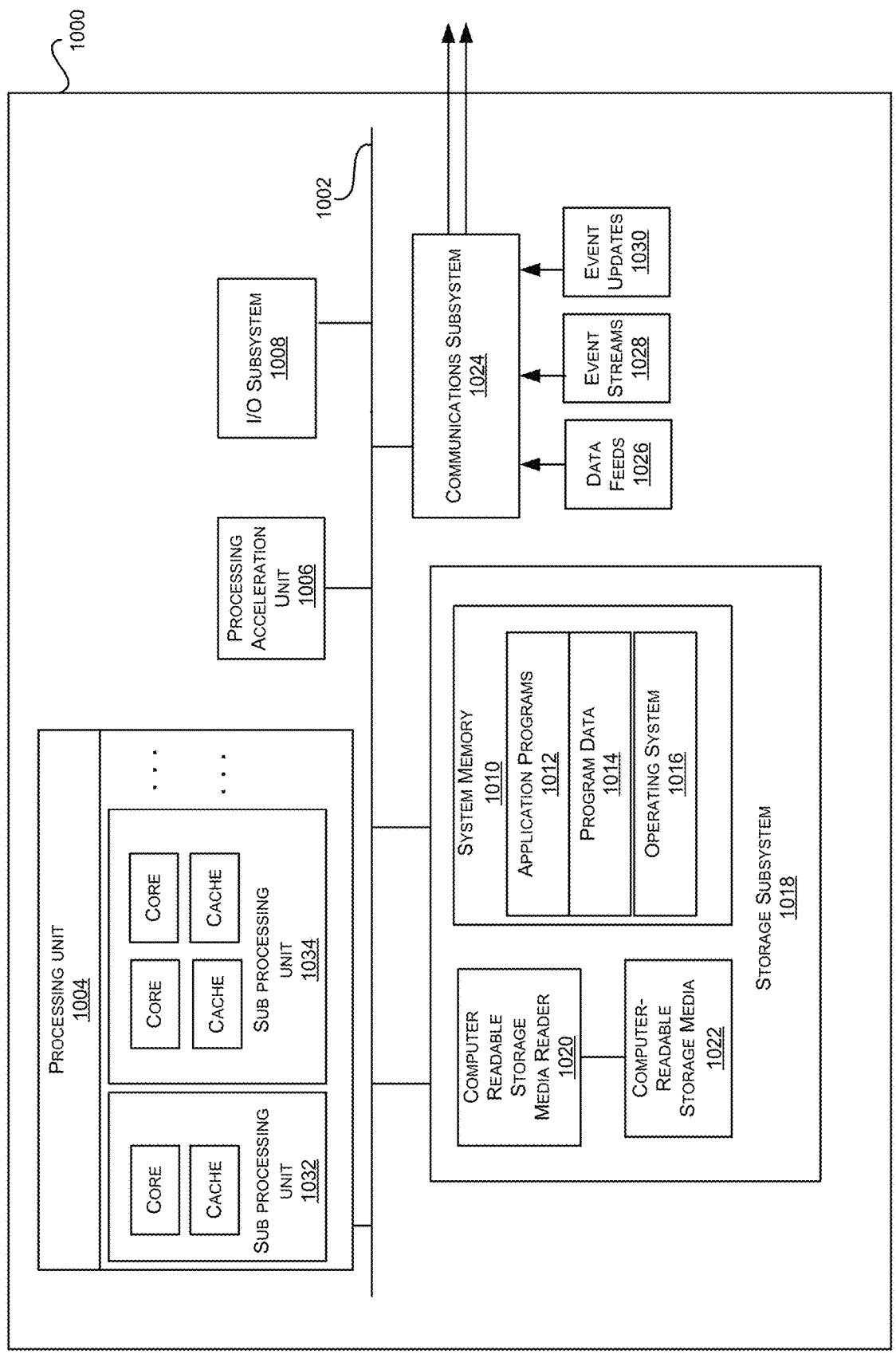
FIG. 10 illustrates an exemplary computer system, in which various embodiments may be implemented.

The BMS system described above that measures and uses the readings from the lithium battery and controls the increased charge rate from the pre-cracked anode particles may be implemented by a computer system that comprises an internal system in an electric vehicle, a remote server, a dedicated simulation system, and/or a distributed combination of these various configurations. FIG. 10 illustrates a computer system 1000 that has been specifically designed to implement the BMS or testing systems described herein. Specifically, these hardware and software modules depicted in FIG. 10 may be part of the BMS, part of a simulation system, and/or part of a remote server. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. An unassembled battery cell comprising:
   a cathode layer;
   an anode layer comprising anode particles, wherein a plurality of the anode particles have non-spanning cracks induced in the anode particles from cyclic tension applied to the anode layer prior to the anode layer being combined with the cathode layer in the battery cell; and
   a case, wherein the cathode layer and the anode layer are not yet housed within the case.

2. The battery cell of claim 1, wherein the anode particles comprise graphite particles.

3. The battery cell of claim 1, wherein the non-spanning cracks increase the surface area of the plurality of anode particles to receive lithium ions.

4. The battery cell of claim 1, wherein the anode particles further comprises a layer of passive Solid Electrolyte Interphase (SEI) caused by the non-spanning cracks.

5. The battery cell of claim 1, wherein the anode layer further comprises:
   a binder;
   a conductive material; and
   silicon.

6. A method of providing a battery cell with pre-cracked anode particles, the method comprising:
   providing an anode substrate;
   depositing a plurality of anode particles on the anode substrate to form an anode layer;
   applying cyclic tension to the anode layer until non-spanning cracks are induced in the anode particles; and
   after applying the cyclic tension to the anode layer until the non-spanning cracks are induced in the anode particles, combining the anode layer with a cathode layer in the battery cell.

7. The method of claim 6, wherein the anode particles comprise graphite particles.

8. The method of claim 6, wherein the non-spanning cracks increase the surface area of the plurality of anode particles to receive lithium ions.

9. The method of claim 6, wherein the cyclic tension comprises a plurality of tension cycles in a first axial direction of the anode layer.

10. The battery cell of claim 9, wherein the cyclic tension further comprises a plurality of tension cycles in a second axial direction of the anode layer.

11. The battery cell of claim 10, wherein the first axial direction is orthogonal to the second axial direction.

12. The method of claim 6, wherein the cyclic tension comprises at least 100 tension cycles.

13. The method of claim 6, wherein the anode particles further comprises a layer of passive Solid Electrolyte Interphase (SEI) caused by the non-spanning cracks.

14. The method of claim 6, wherein the cyclic tension is applied above a first threshold such that the non-spanning cracks form, but below a second threshold such that spanning cracks would form.

15. The method of claim 6, wherein the anode layer further comprises:
   a binder;
   a conductive material; and
   silicon.

* * * * *